United States Patent [19]

Härdmark et al.

[11] 4,328,622
[45] May 11, 1982

[54] APPARATUS FOR MEASURING THE EVENNESS OF A ROAD SURFACE

[75] Inventors: Ragnar M. Härdmark; Bror A. S. Hanberger, both of Linköping, Sweden

[73] Assignee: Saab-Scania Aktiebolag, Sodertalje, Sweden

[21] Appl. No.: 166,782

[22] Filed: Jul. 7, 1980

[30] Foreign Application Priority Data

Jul. 10, 1979 [SE] Sweden ................. 7906019

[51] Int. Cl.³ .......................... G01B 7/28; G01B 7/34
[52] U.S. Cl. ................. 33/174 P; 33/172 E; 33/174 PA; 33/DIG. 13; 33/174 L
[58] Field of Search ............ 33/148 H, 149 J, 172 B, 33/172 E, 174 L, 174 P, 174 PA, DIG. 8, DIG. 13

[56] References Cited

U.S. PATENT DOCUMENTS

| | | | |
|---|---|---|---|
| 2,607,128 | 8/1952 | Newhall | 33/DIG. 13 |
| 3,368,399 | 2/1968 | Wirz | 33/149 J |
| 3,442,121 | 5/1969 | Wirz | 33/172 E |
| 3,816,927 | 6/1974 | Theurer et al. | 33/DIG. 13 |
| 4,123,847 | 11/1978 | Bosselaar et al. | 33/DIG. 13 |
| 4,160,325 | 7/1979 | DeNicola | 33/DIG. 13 |

FOREIGN PATENT DOCUMENTS

| | | |
|---|---|---|
| 1773946 | 12/1971 | Fed. Rep. of Germany . |
| 1130588 | 10/1968 | United Kingdom . |
| 691683 | 10/1979 | U.S.S.R. ............... 33/172 E |

*Primary Examiner*—Richard R. Stearns
*Attorney, Agent, or Firm*—Cushman, Darby & Cushman

[57] ABSTRACT

An apparatus for measuring the evenness of a substructure, e.g. a road surface, is fitted to a vehicle. The free ends of a number of pivotable measuring arms, uniformly spaced side by side over the entire vehicle width, engage the substructure resiliently during measurement. Each measuring arm is pivotably mounted in a measuring housing which has a plate spring coacting with each arm. On pivotation of the arm relative to said housing, as a result of unevenness in the substructure, the plate spring executes a corresponding deflection, sensed by strain gauges attached to said spring and giving output signals, proportional to the deflection, to an electronic unit wherein the signals are converted to output data representing the surface evenness of the substructure.

10 Claims, 3 Drawing Figures

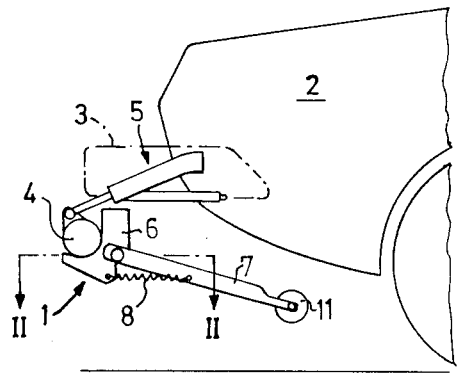
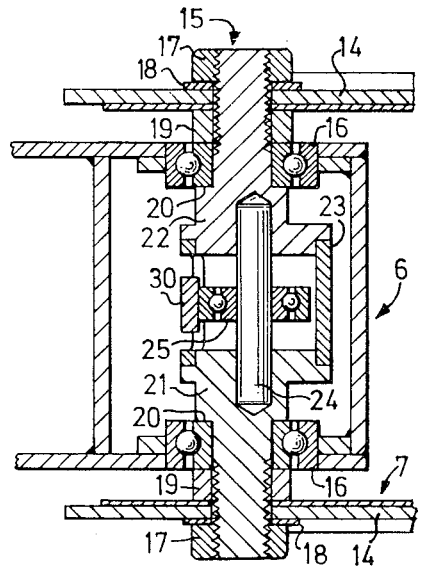
FIG. 1  FIG. 2
FIG. 3

APPARATUS FOR MEASURING THE EVENNESS OF A ROAD SURFACE

The present invention relates to an apparatus for measuring the evenness of a road surface, said apparatus being installed on a vehicle and comprising a number of measuring arms with free ends, pivotably supported side by side and uniformly spaced over the whole width of the vehicle, said free ends of the measuring arms being provided with wheels resiliently engaging against the road surface during measurement.

Such an apparatus has already been presented, where the measuring arms are formed as plate springs, which at their respective free ends have rolls that are urged by the spring force to press against the substructure. By sensing, in a mode not more closely disclosed, the deflection of such a measuring arm, it is possible to obtain a value for the evenness of the substructure. In attempts practically to develop such an apparatus, problems have occurred with regard to the plate spring structure of the measuring arms, since both a robust and pliant embodiment cannot thereby be obtained. Such requirements must namely be fulfilled if a satisfactory measuring result is to be obtained for measurements at higher speeds. Furthermore, sensing the deflection of the measuring arms requires a structure exposed to outside effect, which can be expected to cause functional disturbances.

The present invention has the task of creating an apparatus in accordance with the introduction, which can fulfill the requirements with respect to robust construction and functionally reliable measuring transducer arrangement which must be called for with a measuring apparatus intended for measurements at comparatively high speeds, i.e. at least 70 km/h.

An inventive apparatus meeting said requirements is substantially characterized in that each measuring arm is pivotably mounted in a measuring housing rigidly attached to the vehicle and is urged to pivot towards the road surface by means of at least one separate spring, there being provided in the measuring housing a plate spring which is caused to deflect in proportion to the pivotation of the measuring arm, said plate spring being provided with at least one strain gauge for detecting said deflection and for generating a signal proportional to said pivotation, there being provided an electronic unit for receiving said signal and for generating in response thereto output data representing the evenness of the road surface.

A plate spring provided with strain gauges has thus been placed in the protection of a measuring housing in the inventive apparatus, the plate spring being actuated in said housing by the pivotable mounting of the measuring arm. The result of this is that it has been possible to form the measuring arm in response to high demands on stability without this negatively affecting the measuring ability of the apparatus.

Other distinguishing features of the invention will be noted from an embodiment exemplifying the invention, which will be described hereinafter, and the following patent claims. The description will be made with reference to the attached figures, of which FIG. 1 is a side view of a measuring apparatus in accordance with the invention, FIG. 2 is a horizontal section through a measuring housing incorporated in the measuring apparatus, along the line II—II in FIG. 1, and FIG. 3 is a section along the vertical plane of symmetry of said housing.

FIG. 1 illustrates how the measuring apparatus 1 is mounted at the front end of a motor vehicle 2 under a bumper 3 attached to said vehicle. The measuring apparatus 1 has transverse extension across the whole width of the vehicle 2, and is provided with retractable end portions which give the measuring apparatus a width of about 2.5 m when in their active positions. In its retracted position, the measuring apparatus comes to the respective sides of the vehicle 2.

A transverse tubular beam 4 is a carrying member for the measuring apparatus, and is carried by two bracket structures 5 attached to the vehicle and placed symmetrically. The beam 4 is pivotably mounted relative to the brackets 5 and a hydraulic cylinder, not shown, which extends between the vehicle and the beam 4 to actuate the pivoting movements of the beam 4 on being activated. The beam 4 can assume one of two positions, an upper position constituting the position of rest or inactive position of the measuring apparatus (shown in FIG. 1) and a lower position constituting the measuring position of the measuring apparatus.

A number of measuring housings 6 are attached to the beam 4, each of which carries a pivotably mounted measuring arm 7. The number of arms 7 and housings 6 is 26 in an advantageous embodiment of the invention. A helical spring 8 is secured to and is coacting with the respective arm 7 and is pivotably secured to a shaft 9, said shaft being mounted on the lower portion of the housing 6 and provided with a roller 10. When the measuring apparatus is in an inactive position, the spring 8 urges the arm 7 into engagement against a fixed stop (not shown) arranged on the housing 6. When the measuring apparatus is in its measuring position, the spring 8 ensures that the free end of the arm 7 engages against the substructure, said fixed stop then serving solely to limit the pivoting movement of the arm 7.

A wheel 11, of comparatively small size, is rotatably mounted at the free end of the arm 7. The wheel 11 facilitates the accommodation of the arm 7 to the substructure during vehicle movements and prevents wear on the free end of the arm 7.

It will be seen from FIG. 2 how two cheek plates 14 formed on the arm 7 on either side of the housing 6 are pivotably mounted relative to the housing 6. This is accomplished by means of a composite shaft 15 which is allowed to perform pivoting movements relative to the housing 6 via ball bearings 16. The cheek plates 14 are non-rotatably mounted on the threaded ends of the shaft 15 by means of nuts 17 and washers 18. At the respective end, the nut 17 forces the cheek plate 14 into engagement against a spacer sleeve 19 bearing against a shoulder 20 formed on the shaft 15, via the inner ring of the ball bearing 16.

The shaft 15 is divided into two end portions 21,22 kept together by a spacer 23, substantially formed as a half-cylinder, and an eccentrically disposed pin 24 carrying a ball bearing 25. With its free end portion (see FIG. 3), a plate spring 30 bears against the outer ring of the ball bearing 25. By means of bolts (not shown) the other end of the spring 30 is rigidly clamped between two parts 31,32, kept together by bolts (not shown), of a calibrating unit 33 attached to the housing 6. Said unit is accessible for adjustment from the outside via an opening 34 in the housing 6, said opening being sealable by means of a cover (not shown).

The calibrating unit 33 is pivotably mounted relative to the housing 6 about a shaft 35. Two set screws 37,38, lockable by nuts 36 and placed mutually at right angles, decide the position of the calibrating unit 33 relative to the housing 6, whereby the engagement of the spring 30 against the ball bearing 25, functioning as an eccentric, can be adjusted.

On the respective sides of the spring 30 there are attached strain gauges 39 for sensing the deflections of the spring 30. These deflections are directly proportional to the pivotation of the eccentric, and thereby the arm 7, as a result of unevenness in the substructure. The strain gauges 39 have connections (not shown) to an electronic unit (not shown) installed in the vehicle, input signals from the gauges 39 on all the arms 7 being converted in said electronic unit to output data representing the profile of the substructure.

Each housing 6 is attached to the beam 4 by means of a screw 40 which, together with the advantageous placing of the measuring apparatus at the front of the vehicle, enables simple service of the housings 6 and the arms 7 as well as repairs thereto. A threaded pipe 41 is welded to the beam 4 and adapted to pass through a free hole 42 made in the housing 6. The screw 40 is screwed into said pipe 41 and via a spacer collar 43 bears against the housing 6 to force the beam 4 into accurately defined engagement against supports 44 arranged on the housing 6.

An inventive measuring apparatus thus enables a robust structure, where the measuring transducers are protectively built into a housing 6. The risk of functional disturbances is thus small, even if measurements are made at comparatively high speeds. Furthermore, each housing permits simple calibration of the transducer unit and, together with the respective arm 7, is also easily removable from the beam 4 for service and repairs.

A plurality of modifications of the described embodiment can be conceived within the scope of the invention and the following patent claims. For example, it is possible to attach one end of the spring 30 to the shaft, while its free end portion is caused to come into coaction with support means attached to the housing 6 when the shaft rotates.

What we claim is:

1. An apparatus for measuring the evenness of a road surface, said apparatus being installed on a vehicle and comprising a plurality of measuring arms each having a free end, means pivotably supporting the arms in side-by-side, uniformly-spaced relationship across the whole width of the vehicle, said free ends of the measuring arms being provided with wheels which engage with the road surface during use of the apparatus, characterized in that each measuring arm is pivotably mounted in a measuring housing rigidly attached to the vehicle and is urged to pivot towards the road surface by means of at last one separate spring, there being provided in the measuring housing a plate spring which is in engagement with structure movable with the respective arm so that the plate spring deflects in proportion to pivoting of the measuring arm, said plate spring being provided with at least one strain gauge for detecting said deflection and for generating a signal proportional to said pivotation, there being provided an electronic unit for receiving said signal and for generating in response thereto output data representing the evenness of the road surface.

2. An apparatus as claimed in claim 1, characterized in that there is a measuring housing for each measuring arm.

3. An apparatus as claimed in claim 1 or 2, characterized in that the plate spring is at one end rigidly clamped in a calibrating unit, said unit being adjustably attached to the measuring housing, while the other end of the plate spring freely engages against an eccentric arranged at the mounting of the arm in the housing.

4. An apparatus as claimed in claim 3, characterized in that there is included in the mounting of the arm a shaft non-rotatably attached to said arm, said shaft having two axially separated parts connected to each other via an eccentrically mounted intermediate shaft, on which a rolling bearing is mounted, the free end of the plate spring engaging against said bearing.

5. An apparatus as claimed in claim 2, characterized in that each measuring housing is attached by means of a screw to a beam extending transverse to the vehicle.

6. Apparatus for measuring the evenness of a road surface comprising: a plurality of measuring arms arranged in side-by-side uniformly-spaced relationship, each of said arms having a free end carrying a road-engageable wheel and an opposite end; means for mounting the opposite ends of the arms to a vehicle for pivotal movement in a vertical plane, said mounting means including a separate pivotal connection for each arm and a separate spring biasing each arm downwardly toward a road-engaging position; and means for measuring pivotal movement of the arms as an indication of road surface evenness, said measuring means including a plate spring for each arm, a strain gauge associated with each plate spring for generating a signal proportional to deflection of the respective plate spring and means for converting pivotal movement of each arm to deflection of the respective plate spring.

7. Apparatus as in claim 6 wherein said mounting means includes a plurality of side-by-side housings and means for attaching said housings to a vehicle, the pivotal connection for each arm being located within a separate one of said housings and each of said housings containing the respective plate spring for the pivoted arm.

8. Apparatus as in claim 7 wherein one end of each plate spring is clamped in a calibrating unit which is disposed within and adjustably attached to the respective housing, and wherein each pivotal connection between the respective housing and respective arm includes an eccentric against which the respective plate spring bears.

9. Apparatus as in claim 8 wherein each of said pivotal connections includes a shaft fixed to each arm, the shaft having two axially spaced parts and wherein said eccentric includes an intermediate shaft disposed eccentrically to said shaft parts and connecting them together and a roller bearing mounted on said intermediate shaft, the respective plate spring bearing against the roller bearing.

10. Apparatus as in claim 7 wherein said means for attaching said housings to a vehicle includes a horizontal beam to which each of said housings is releasably secured.

* * * * *